Patented Apr. 3, 1951

2,547,496

UNITED STATES PATENT OFFICE 2,547,496

BIS-SUCCINIMIDO-ESTERS

Stanley P. Rowland, Philadelphia, Pa., assignor to Rohm & Haas Company, Philadelphia, Pa., a corporation of Delaware No Drawing. Application December 29, 1949, Serial No. 135,821

13 Claims. (Cl. 260—326.5)

This invention relates to new bis-succinimido-esters and to a process for preparing them. The new compounds have the general formula

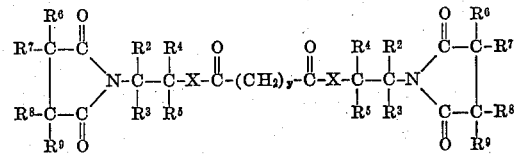

in which X represents an atom of oxygen or sulfur; $y$ is an integer of value 4 to 8 inclusive; $R^2$, $R^3$, $R^4$, and $R^5$ represent hydrogen atoms or monovalent organic radicals which are unreactive with acid anhydrides and, therefore, are free of alcoholic groups and amino-hydrogen atoms and which preferably are hydrocarbon radicals; and $R^6$, $R^7$, $R^8$, and $R^9$ represent hydrogen atoms or hydrocarbon radicals, preferably alkyl or alkenyl groups.

The process involves a new chemical reaction which comprises chemically combining (a) two molar equivalent weights of succinic anhydride or of a substituted succinic anhydride of the formula

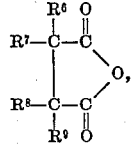

in which the R's have the same significance as is described above, with (b) one molar equivalent weight of a bis-oxazoline or a bis-thiazoline having the general formula

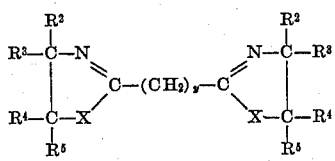

in which the R's X, and $y$ have the significance described above. This reaction takes place according to the following general equation:

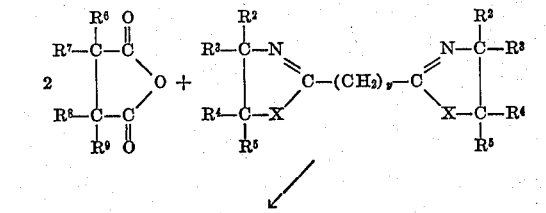

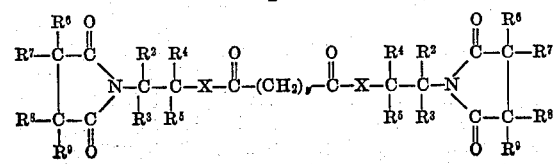

A specific example, in which succinic anhydride per se and a particular bis-oxazoline, 1,4,-tetramethylene-bis-2-(5-methyl-oxazoline) are reacted, may make for a clearer understanding of the new reaction of this invention:

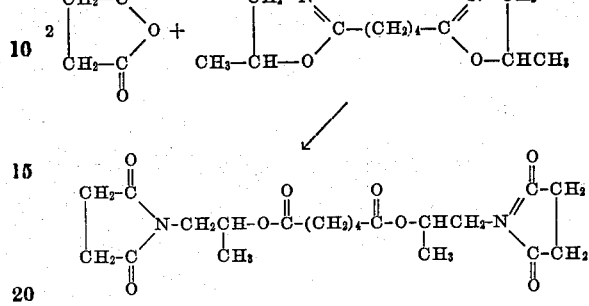

(bis-succinimidoisopropyl adipate)

Careful study has shown that the succinic anhydrides described herein react in the same manner as succinic anhydride per se and that the bis-oxazolines and bis-thiazolines described herein react in the same manner as the bis-oxazoline above. That is, the groups which are represented by the R's and X in the general formula above remain intact and unchanged during the process, and the reaction does, in fact, take the course shown above. This process has real advantages over other methods of making imido-esters, such as speed and ease of reaction, quantitativeness or completeness of reaction, and freedom from the formation of by-products.

So that no interfering side-reactions can take place, it is necessary that the organic radicals which are represented by the R's be unreactive with acid anhydrides. Thus, they must be free of such substituents as hydroxyl groups and amino-hydrogen atoms. Whether or not a particular substituent is reactive with acid anhydrides is well within the knowledge of one skilled in chemistry. It is much preferred that the radicals which are represented by the R's be hydrocarbon radicals such as alkyl, aryl, aralkyl, alkaryl, and cycloalkyl. The following list includes examples of such suitable hydrocarbon radicals: Methyl, ethyl, isopropyl, sec.-butyl, tert.-amyl, 2-ethylhexyl, lauryl, n-tetradecyl, and octadecyl groups and the isomers of these groups; phenyl, tolyl, benzyl, p-octylphenyl, m-xylyl, 2,4-di-tert.-amylphenyl, cyclohexyl, and naphthyl groups.

Although those bis-azolines are preferred in which the substituents represented by the R's are hydrocarbon radicals, it is a fact that bis-succinimido esters are readily prepared by reacting succinic anhydrides with bis-azolines in which the substituents, R's[2 to 5], also contain other elements in addition to carbon and hydrogen. Thus, halogen groups may be present as well as nitro, ether, keto, aldehydo, sulfonic, and tertiary amine groups. None of these groups reacts with acid anhydrides and none interferes with the reaction of the succinic anhydride with the bis-oxazolines or bis-thiazolines.

Suitable and operable bis-azolines; that is, both bis-oxazolines and bis-thiazolines, include the following by way of example:

1,4-tetramethylene bis-azolines;
1,4 - tetramethylene-bis-2-(5-methylazolines);
1,8-octamethylene bis-azolines;
1,5 - pentamethylene-bis-2-(5-ethylazolines);
1,6 - hexamethylene-bis-2-(5-phenylalzolines);
1,7 - heptamethylene-bis-2-(5-p-chlorophenylazolines);
1,8 - octamethylene - bis - 2-(4,5-dimethylazolines);
1,8 - octamethylene - bis - 2-(5,5-dimethylazolines);
1,7 - heptamethylene - bis - 2 - (4,4,5-triethylazolines);
1,5 - pentamethylene-bis-2-(4,4,5,5-tetramethylazolines);
1,4 - tetramethylene - bis - 2-(5-naphthylazolines);
1,4 - tetramethylene-bis-2-(5-chloromethylazolines);
1,5-pentamethylene-bis-2-(5-benzylazolines);
1,6 - hexamethylene-bis-2-(5-p-nitrophenylazolines);
1,4 - tetramethylene-bis-2-(5-diethylaminoazolines);
1,4 - tetramethylene-bis-2-(5-diisobutylaminoazolines);
1,6 - hexamethylene-bis-2-(5-phenyl-5-methylazolines);
1,4 - tetramethylene - bis-2-(4-methyl-4-ethylazolines);
1,4 - tetramethylene-bis-2-(4-methyl-5-phenylazolines);
1,4 - tetramethylene-bis - 2 - (4,4-dibenzylazolines);
1,6 - hexamethylene - bis-2-(4,5-dipropylazolines);
1,6 - hexamethylene-bis-2 - (4,4 - dibutyl-5-isopropylazolines);
1,7 - heptamethylene - bis-2-(4-naphthylazolines);
1,8-octamethylene-bis-2-(5-tolylazolines)

and the like.

Suitable succinic anhydrides which are known to react according to the process of this invention include the following: Methyl; alpha, beta-diethyl; alpha, alpha-dimethyl; alpha, alpha, beta-trimethyl; ethyl; alpha, alpha-diethyl; alpha, beta-diethyl; alpha, alpha, beta, beta-tetraethyl; isopropyl; sec.-butyl; tert.-amyl; alpha, beta-dihexyl; alpha, alpha-dioctyl; heptenyl; undecenyl; and alpha, beta-dilauryl succinic anhydrides. Thus, in the general formula given above, the characters $R^6$, $R^7$, $R^8$, and $R^9$ represent hydrogen atoms or alkyl groups or alkenyl groups. On the basis of cost and availability those succinc anhydrides which contain one or two alkyl groups on the same carbon atom are much preferred, although all of the alkyl and substituted succinic anhydrides are satisfactory from the standpoint of ease of reaction with the bis-azolines.

The reactions between the succinic anhydrides and the bis-azolines take place fairly readily and often exothermically. Reaction takes place even at room temperature (20° C.) but the rate of reaction is unnecessarily slow. Heating of the reactants accelerates the rate of reaction and for this reason a minimum temperature of 50° C. is recommended. Temperatures up to 300° C. are operable but at the higher temperatures by-products are frequently formed. Accordingly, an upper temperature of 250° C. is much preferred. It has also been found that in general it is advantageous to maintain as low a temperature of reaction as is feasible when the bis-azoline carries two substituents, such as alkyl groups, in the positions occupied by $R^4$ and $R^5$ in the general formula above. In such cases a maximum temperature of about 150° C. is suggested. For convenience, inert solvents can be employed. Likewise, catalysts, such as alcoholates, zinc chloride, and the like, can be used, although ordinarily the reaction takes place rapidly enough in the absence of catalysts. Other expedients well-known to those skilled in the art, such as variations in pressure, solvent-extraction of the product, excess of one reactant, and the like, can be used without departing from the spirit of this invention which is one of preparing bis-succinimido esters by combining, preferably under the influence of heat, two molar equivalent weights of a succinic anhydride and one molar equivalent weight of a bis-oxazoline or a bis-thiazoline.

*Example 1*

Six grams of succinic anhydride and 6.72 grams of 1,4-tetramethylene-bis-2-(5-methyloxazoline) are thoroughly mixed and sealed in a glass tube. The tube and contents were heated at 190° C. for three hours. The product was a very viscous, fluid, resinous mass which was soluble in dioxane and ethanol. Its acid number was 104 which indicated that the combination of succinc anhydride and the bis-oxazoline was 80% complete. The product was thoroughly washed first with a 10% aqueous solution of sodium hydroxide and then with distilled water, after which it was stripped at 140° C. to 150° C. and 1 mm. of pressure (Hg). The thus purified material was analyzed and its analysis corresponded to the calculated values for bis-succinimidoisopropyl adipate.

Substituted succinic anhydrides react as readily as succinic anhydride itself. In fact, their reaction with bis-oxazolines ordinarily proceeds more smoothly than that of succinic anhydride under the same operating conditions. Usually the reaction takes place more rapidly as evidenced by a faster drop in the acid number and the product is customarily cleaner which indicates a freedom from by-products. Thus is apparent from the following examples.

*Example 2*

Into a three-necked balloon flask, equipped with thermometer, agitator, and reflux condenser, was placed a mixture of two moles of heptanylsuccinic anhydride and one mole of 1,4-tetramethylene-bis-2-(5-methyloxazoline). When the mixture was stirred at room temperature, the viscosity of the solution increased as reaction took place. From an original value of 0.85 poise, the viscosity increased to 5.7 poises in one hour and to 34 poises in 66 hours. When an identical mixture of reactants was heated to 190° C. and held there for two hours, the reaction was accelerated. Although the reaction mixture was a stirrable liquid at 190° C., it became a very viscous, resinous fluid on cooling. The product was soluble in ethanol, dioxane, and hot xylene and had an acid number of 24.5 which indicated that the reaction was about 93% complete. The product was then stripped at 140° C. to 150° C. and 1 mm. of pressure (Hg). The residue had an analysis corresponding to that of bis-heptenyl-succinimidoisopropyl adipate.

*Example 3*

In the same manner described in Example 2, two moles of undecenylsuccinic anhydride and one mole of 1,7-heptamethylene-bis-2-(5-methyloxazoline) were reacted to form bis-undecenyl-succinimidoisopropyl azelate. From an original value of 1.6 poises, the viscosity of the mixture increased to 8.4 poises in an hour and to 10.0 poises in 66 hours at room temperature. An identical combination of reactants which was heated at 190° C. for two hours yielded a product which on cooling was a clear, sticky, resinous material. This was soluble in xylene, dioxane, acetone, and ethanol and had an acid number of 9.4 which indicated that the reaction was about 97% complete.

*Example 4*

By the procedure of Example 1, two moles of alpha, alpha-dimethylbenzylsuccinic anhydride were reacted with one mole of 1,8-octamethylene-bis-2-(5-methyloxazoline) to form bis-alpha, alpha-dimethylbenzylsuccinimidoisopropyl sebacate. Observations on a portion of the mixture of reactants showed that the viscosity of the mixture increased from an original value of 5.5 poises to 37 poises in 66 hours at room temperature. The main portion of reactants was heated at 180° C. for three hours. The product on cooling was a clear, brittle, solid mass which was soluble in ethanol, dioxane, acetone, and hot xylene and which had an acid number of 11.4, which indicated that the reaction was about 96% complete.

*Examples 5-14*

Further demonstration of the general applicability of the process of this invention was made by reacting two molar equivalent amounts of succinic anhydrides with one molar equivalent amount of various bis-oxazolines and bis-thiazolines at 180° C. for three hours, after which the extent of the reaction was determined by titration of the unreacted anhydride with a standardized solution of potassium hydroxide. Following is a tabulation of the reactants and the extent to which they reacted with the formation of the corresponding bis-succinimido-esters or thioesters according to the general equation above. In all cases, the results of analysis confirm the structure of the imido-ester.

| Anhydride | Bis-Azoline | Extent of Reaction |
|---|---|---|
| | | *Per cent* |
| Succinic | 1,4-Tetramethylene-bis-2-(5-ethyloxazoline). | 81.3 |
| Do | 1,5-Pentamethylene-bis-2-(4,4-dimethyloxazoline). | 78.8 |
| Methylsuccinic | 1,8-Octamethylene-bis-2-(4,5-diethyloxazoline). | 89.4 |
| Alpha,beta-Dimethyl-succinic. | 1,7-Heptamethylene-bis-2-(5-hexyloxazoline). | 82.8 |
| Alpha,alpha-Dimethyl-succinic. | 1,4-Tetramethylene-bis-2-(4,4,5-trimethyloxazoline). | 73.9 |
| Succinic | 1,4-Tetramethylene-bis-2-(5-methylthiazoline). | 74.1 |
| Do | 1,5-Pentamethylene-bis-2-(4,4-dimethylthiazoline). | 79.7 |
| Undecenylsuccinic. | 1,8-Octamethylene-bis-2-(5-methylthiazoline). | 84.6 |
| Heptenylsuccinic | 1,6-Hexamethylene-bis-2-(5-phenyloxazoline). | 94.3 |
| Methylsuccinic | 1,6-Hexamethylene-bis-2-(5-p-chlorophenyloxazoline). | 92.1 |

It will be noted from the above examples that substituted succinic anhydrides react in the same way as succinic anhydride per se, and that the bis-thiazolines and the bis-oxazolines react alike. It is also true that the substituents on the anhydrides and on the bis-azolines, which are represented by the R's in the general formulas above, as well as the methylene groups between the heterocyclic rings of the bis-azolines do not take part in the reaction and do not interfere with the reaction between the anhydrides and the bis-azolines. Extensive study of the general process has shown that it is advantageous to employ lower temperatures (below about 150° C.) when the two $R^4$'s and the two $R^5$'s are hydrocarbon substituents.

The products of this invention have a wide variety of uses. Many of them have marked properties as regulants for plant growth. Others are effective as additives for lubricating oils. Still others are compatible with synthetic plastics and serve as plasticizers therefor.

I claim:

1. A process for the preparation of bis-succinimido-esters of the general formula

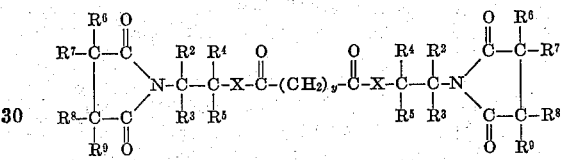

which comprises chemically reacting at a temperature from 20° C. to 300° C. two molar equivalent weights of a succinic anhydride of the formula

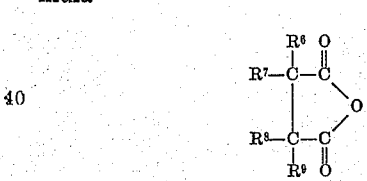

and one molar equivalent weight of a bis-azoline of the general formula

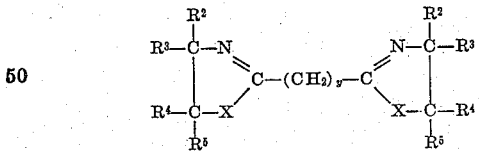

in which formulas $y$ is an integer of value 4 to 8 inclusive; X represents an atom of an element from the class consisting of oxygen and sulfur; $R^2$, $R^3$, $R^4$ and $R^5$ represent members of the class consisting of hydrogen atoms and alkyl, aryl, aralkyl, alkaryl, and cycloalkyl groups; and $R^6$, $R^7$, $R^8$ and $R^9$ represent members of the class consisting of hydrogen atoms, alkyl groups, and alkenyl groups.

2. A process for the prepartion of bis-succinimidoesters of the general formula

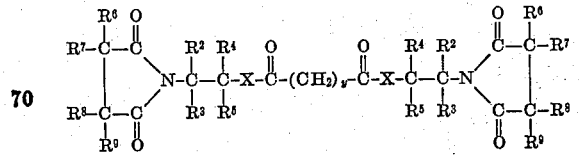

which comprises chemically reacting at a temperature from 50° C. to 250° C. two molar equivalent weights of a succinic anhydride of the formula

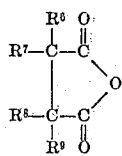

and one molar equivalent weight of a bis-azoline of the general formula

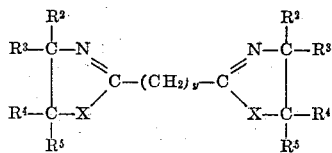

in which formulas $y$ is an integer of value 4 to 8 inclusive; X represents an atom of an element from the class consisting of oxygen and sulfur; $R^2$, $R^3$, $R^4$ and $R^5$ represent members of the class consisting of hydrogen atoms and alkyl, aryl, aralkyl, alkaryl, and cycloalkyl groups; and $R^6$, $R^7$, $R^8$ and $R^9$ represent members of the class consisting of hydrogen atoms, alkyl groups, and alkenyl groups.

3. A process for the prepartion of bis-succinimidoisopropyl adipate which comprises chemically reacting at a temperature of 50° C. to 250° C. two molar equivalent weights of succinic anhydride and one molar equivalent weight of 1,4-tetramethylene-bis-2-(5-methyloxazoline).

4. A process for the preparation of bis-succinimidoisopropyl sebacate which comprises chemically reacting at a temperature of 50° C. to 250° C. two molar equivalent weights of succinic anhydride and one molar equivalent weight of 1,4-tetramethylene-bis-2-(5-phenyloxazoline).

5. A process for the prepartion of bis-beta-succinimido-alpha-phenyl-ethyl adipate which comprises chemically reacting at a temperature of 50° C. to 250° C. two molar equivalent weights of succinic anhydride and one molar equivalent weight of 1,4-tetramethylene-bis-2-(5-phenyl-oxazoline).

6. As new chemical compounds, bis-succinimido esters of the general formula

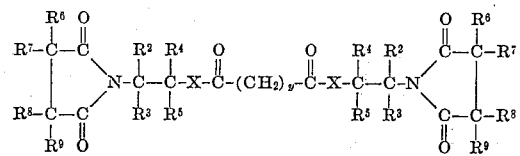

in which $y$ is an integer of value 4 to 8 inclusive; X represents an atom of an element from the class consisting of oxygen and sulfur; $R^2$, $R^3$, $R^4$ and $R^5$ represent members of the class consisting of hydrogen atoms and alkyl, aryl, aralkyl, alkaryl, and cycloalkyl groups; and $R^6$, $R^7$, $R^8$ and $R^9$ represent members of the class consisting of hydrogen atoms, alkyl groups, and alkenyl groups.

7. As a new chemical compound, bis-succinimidoisopropyl adipate having the formula

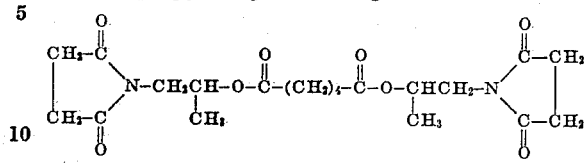

8. As a new chemical compound, bis-succinimidoisopropyl sebacate having the formula

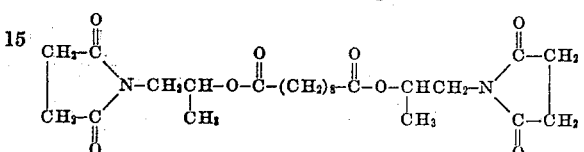

9. As a new chemical compound, bis-beta-succinimido-alpha-phenyl-ethyl sebacate having the formula

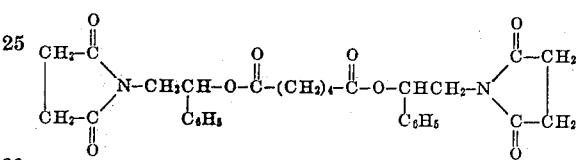

10. A process for the prepartion of bis-succinimidoisobutyl adipate which comprises chemically reacting at a temperature from 50° C. to 250° C. two molar equivalent weights of succinic anhydride and one molar equivalent weight of 1,4-tetramethylene-bis-2-(5-ethyloxazoline).

11. A process for the preparation of bis-succinimido-isopropyl thioadipate which comprises chemically reacting at a temperature from 50° C. to 250° C. two molar eqivalent weights of succinic anhydride and one molar equivalent weight of 1,4-tetramethylene-bis-2-(5-methylthiazoline).

12. As a new chemical compound, bis-succinimidoisobutyl adipate having the formula

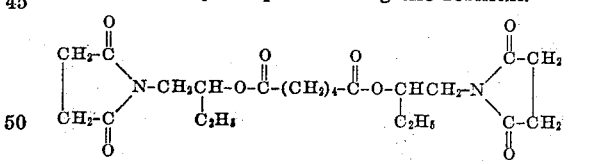

13. As a new chemical compound, bis-succinimidoisopropyl thioadipate having the formula

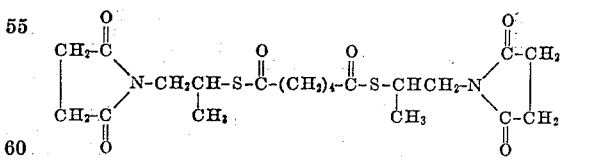

STANLEY P. ROWLAND.

No references cited.